INVENTORS:
WILLIAM ANTHONY CLAPS
ERVIN LUCIAN DORMAN

BY: Silverman + Cass
ATT'YS

June 18, 1968    W. A. CLAPS ET AL    3,389,335
AUTOMATIC CONTROL STRUCTURE FOR PARTICLE STUDY APPARATUS
Filed Oct. 19, 1964      4 Sheets-Sheet 2

Fig. 2

INVENTORS:
WILLIAM ANTHONY CLAPS
ERVIN LUCIAN DORMAN

BY: Silverman & Cass

ATT'YS

Fig. 4

3,389,335
AUTOMATIC CONTROL STRUCTURE FOR
PARTICLE STUDY APPARATUS
William Anthony Claps and Ervin Lucian Dorman, Hialeah, Fla., assignors to Coulter Electronics, Inc., Hialeah, Fla., a corporation of Illinois
Filed Oct. 19, 1964, Ser. No. 404,691
24 Claims. (Cl. 324—71)

ABSTRACT OF THE DISCLOSURE

Automatic function control structure for a "Coulter Counter" and like particle analyzing devices having one or more of the following: (a) an aperture current source, (b) a source of aperture illumination, (c) a particle counter, (d) a cathode ray tube display. Through use of stop and start electrodes, in the manometric structure, and a bistable device responsive thereto, the items (a)–(d) are controlled at appropriate times to optimize and automate the operation of the analyzing device.

---

This invention relates generally to particle study apparatus and more particularly is concerned with structure which renders the use and operation of such particle study apparatus automatic and foolproof.

Reference will be made hereinafter to certain patents and patent applications, all of which are assigned to the same assignee as the instant application, and these will be identified and referred to as follows:

"Basic Coulter Patent" shall mean U.S. Patent 2,656,-508, issued Oct. 20, 1953 to Wallace H. Coulter and entitled "Means for Counting Particles Suspended in a Fluid."

"Coulter Metering Patent" shall mean U.S. Patent 2,869,078, issued Jan. 13, 1959 to Wallace H Coulter and Joseph R. Coulter, Jr., and entitled, "Fluid Metering Apparatus."

"Coulter Control Circuit Application" shall mean U.S. Patent 3,271,671, issued Sept. 6, 1966, to Wallace H. Coulter and entitled "Particle Analyzing Device."

"Henderson Control Circuit Application" shall mean U.S. Patent 3,271,672, issued on Sept. 6, 1966, to Michael I. Henderson and entitled "Particle Studying Device Control Circuit"; and "Coulter-Hogg Aperture Viewing Application" shall mean a copending U.S. patent application Ser. No. 382,-560, filed July 14, 1964 by Wallace H. Coulter and Walter R. Hogg and entitled, "Particle Counting and Sizing Apparatus."

Reference may be had primarily to the two patents mentioned above for an understanding of commercial embodiments of the device which has become known throughout the world as the "Coulter Counter" and which uses the so-called Coulter principle. The principle involves passing a sample suspension of the particles to be studied through a fine aperture at the same time that an electric current is passed through the aperture, and detecting the changes in the impedance of that portion of the suspension liquid effectively included in the aperture. The Basic Coulter patent describes the apparatus and the principle and the Coulter Metering Patent describes structure for causing the flow of the suspension through the aperture while it is being studied, metering the same and operating a counting device.

While the invention herein was made especially as an improvement upon the operation and use of apparatus constructed in accordance with the Coulter-Hogg Aperture Viewing Application, the novel aspects thereof are equally applicable to almost any kind of device which operates upon the Coulter principle, and for this reason it will be useful to explain the general construction and operation of practical particle counting and sizing device of this type. In addition, some emphasis will be placed upon certain functions which are required to be performed by the practical apparatus, and the performance of which is intended to be rendered substantially fully automatic by the instant invention. This latter desideratum forms one of the principal objects of the invention.

As now well-known, the Basic Coulter patent teaches that when one suspends microscopic particles in an electrolyte having a conductivity different from that of the particles and passes the suspension through a microscopic aperture from a first vessel to a second vessel, both vessels having sufficient liquid therein to fully cover the aperture, each time that a particle is within the aperture, there will be a detectable change in the impedance of the electrolyte which is contained within the aperture. This change is proportional to the volume of the particle irrespective of its configuration, and as a result, signals can be obtained which may be counted and sized. The practical device uses a small vessel having an aperture in its side wall immersed in a larger vessel which contains the sample suspension. The suspension is drawn through the aperture from the body of liquid in the larger vessel into the body of liquid in the small vessel, the latter body of liquid being any electrolyte, not necessarily the same as that of the suspension. A platinum electrode is placed in each vessel and a source of direct current connected across the electrodes to establish a stable electrical current flow between the bodies of fluid through the aperture. Also, the electrodes are connected to electrically circuit generally referred to as an amplifier which can detect the changes in impedance and convert the same into electrical pulses which may be counted. The different amplitudes of the signals enables circuitry used in known devices to classify the particles as to size. Many different kinds of particle study problems can be solved with suitable variations in such circuitry.

In accordance with the Coulter Metering patent, the smaller vessel is a tube whose interior forms a part of an enclosed fluid system leading to a combined manometer and siphon. The larger vessel is an open beaker. The closed fluid system can be connected to a source of vacuum by means of a manually operated valve. The manometer siphon system has a mercury manometer which is in contact with the liquid contained in the tube (hereinafter called aperture tube) so that if there is no outlet or inlet in the tube other than its aperture, movement of the mercury in the manometer will affect the flow of liquid through the aperture. Actally, the user opens a stopcock leading to the source of the vacuum, sucking a quantity of liquid out of the closed system much greater than can easily be passed through the aperture from the beaker. The free end of the manometer is open to the atmosphere so that the mercury will move toward the arm of the manometer that is connected with the aperture tube, this being referred to as the reservoir arm, because of an upper mercury reservoir in the conduit. The mercury is at this time in an unbalanced condition, and it will seek to balance itself by moving toward the open ended arm. Thus, when the stopcock is closed, the mercury will move along the manometer conduit tubing toward a state of balance, but since it is in fluid pressure engagement with the liquid in the aperture tube in the closed system, it will draw sample suspension from the beaker through the aperture into the aperture tube so long as the mercury is moving. As a matter of fact, while drawing the mercury toward the reservoir arm some sample flow through the aperture occurs.

In most Coulter Counters and as taught in the Coulter Metering patent, one portion of the manometer tubing is used as a metering section. This section is accurately calibrated to a known volume and as the mercury traverses this section to fill the same, it will have drawn through the aperture a quantity of sample suspension equal in volume to that of the metering section. Accordingly, and electrode is inserted into the tubing at the bebinning of this section and another at its end, these electrodes being known as the START and STOP electrodes, respectively. A grounding electrode inserted in the manometer in its reservoir arm is always in electrical engagement with the column of mercury. Obviously, as the mercury moves in its conduit, it may complete one electrical circuit when it touches the START electrode, and another electrical circuit when it touches the STOP electrode, and these may be switching or control circuits used for starting and stopping electrical and/or mechanical counters. A detector device will be connected to those electrodes suspended in the aperture tube and beaker and may produce the signals caused by passage of particles through the aperture, but these signals will have no significance unless they represent controlled quantities of sample suspension being tested. The signals can be used to drive counters, but the counters are not turned on until the START circuit is energized, and they will be turned off when the STOP circuit is energized.

From this simple explanation, one can understand now the Coulter Counter is used. Assuming that the sample suspension is in place, that the detector will respond to changes in the impedance of the aperture and produce signals, that no flow is taking place, that the mercury column is balanced or quiescent, and that there is electrical current in the aperture, the user opens the stopcock leading to the vacuum source. (Actually, it is impractical to have aperture current in the balanced system, as will be seen, but this assumption is made for purposes of explanation.) The mercury immediately becomes unbalanced, moving inwardly relative to the atmospheric end of the manometer and emptying the metering section. At this time, the user will normally be required to press a reset button for the purpose of wiping out any prior count which may be registered on the counters. In certain types of devices the reset button may also re-establish the existence of the aperture current which has been cut off since the completion of the previous sample determination.

Now the user closes the stopcock, the mercury commences to return toward its balanced condition, and sample fluid is drawn through the aperture. Signals produced by the passage of particles will not affect the counters until the mercury reaches the START electrode, but after that, the counting circuits or devices are rendered operative and will record the number of pulses passed to the counters from the detector. The detector comprises amplifiers, shaping circuits, and the like.

This will continue until the mercury reaches the STOP electrode. At this time, the counting devices will stop so that their indicated counts will represent the number of particles passed through the detector to the counters for the volume of sample fluid metered in the metering section of the manometer by the passage of mercury. Means may be provided at the end of the sample run to cut off the aperture current, but this will be enlarged upon shortly, especially in connection with the invention herein. If the aperture current is cut off at the time that the STOP electrode is reached, some means will have to be provided to re-establish the aperture current when the next run is made, and this can be done by means of the reset button. Practically, the current must not be flowing while there is no flow of suspension through the aperture, and all particle devices have means to cut off the current.

Examining some of the functions which must be demanded of a practical particle counting and sizing apparatus, probably the most important of these is the starting and stopping of the count. This is certainly accomplished by the structure described above, but note that once the count has been made and observed, it is necessary to reset the counters. This requires the user to perform another manual function in addition to operating the stopcock, which, besides being inconvenient, may give rise to some human error.

An important object of the invention is to have the resetting done automatically, which results in much saving of time and elimination of operator movements.

Another important function required of a practical apparatus is to cut off the aperture current when there is no flow of sample fluid through the aperture and of course to re-establish the current when a succeeding sample determination is being made. The reason this is required is that the high current density in the aperture will quickly boil the fluid if it becomes quiescent. This may destroy or physically change some particles and will result in the production of unwanted vapors, debris and polarization products. Biological and organic particles will especially be affected.

Apparatus constructed in accordance with the Coulter Control Circuit Application was provided with means for automatically cutting off the current in the aperture when the mercury reached the end of the metering section or zone. In this structure the count of particles was registered on several so-called glow transfer counters and one mechanical counter, both types of counters requiring some reset action to wipe the count from them. The detector and amplifier apparatus included a two state electronic circuit for controlling the aperture current flow and a gate circuit for preventing signals from reaching the counters. In unbalanced state, with the mercury withdrawn from the metering section and in the reservoir branch of the manometer, the user was required to press a manual reset button before permitting the mercury to commence moving into the metering zone. This was required in addition to manipulating the stopcock. The manual reset button had to reset the electronic counters and the mechanical counter and had to supply a trigger pulse to change the condition of the two state electronic circuit to a state in which aperture current was permitted to flow, this being referred to as "state One." As the mercury moved along the manometer, signals would be produced by the detector, because there was aperture current and sample flow through the aperture, but because the gate circuit was rendered inoperative, no count was obtained. When the mercury reached and contacted the START electrode, the gate circuit was unlocked by suitable electronic circuitry, all as explained in the said Coulter Control Circuit Application, and from this time onward, while the mercury was filling the metering zone, count pulses could get through the amplifier and gate to the counters. As the mercury passed the START electrode, there was no effect upon the two state device and it remained in state One.

When the mercury reached the STOP electrode, a trigger pulse was applied to the two state device and the same assumed state Two in which the aperture current is cut off. Likewise, the gate circuit was disabled thereby cutting off the counting of pulses. The counters could be read at this time, and the device readied for the next count by drawing the mercury back toward the reservoir branch of the manometer. In passing the STOP electrode, there will be no effect upon the two state device, its condition remaining in state Two and hence there will be no count during this movement.

The Coulter Counter utilizing the above described structure is commercially available in a modified form, constructed in accordance with the disclosure of the copending Henderson Control Circuit application. This device is simplified and rendered substantially more economical by the provision of a third electrode in the manometer near the STOP electrode but spaced therefrom in the direction of the atmosphere end of the manometer. This electrode is connected to the ungrounded platinum electrode of the vessels. (In commercial Coulter Counters, the platinum electrode in the aperture tube is connected to ground and the platinum electrode in the beaker is connected to the amplifier input of the detector and amplifier circuitry.) The two state electronic device, or flip-flop as it is known, is eliminated. Thus, the aperture current will be cut off because the platinum electrodes are short circuited through the mercury column when the mercury column has traversed the metering zone and goes slightly beyond to contact the third electrode. Obviously, when the mercury is returned to its unbalanced or cocked condition and the third electrode isolated once more, aperture current will be flowing for the period of time that the mercury is being drawn toward the reservoir branch by the external vacuum. Since the STOP electrode is also isolated when the mercury passes out of the metering zone, the counting circuits will be energized since the START electrode is in contact and the STOP electrode is free. This gives a spurious count on the counter devices for a very short time, changing the readings already on the counters, which of course requires that such readings be taken before recocking the apparatus. Obviously there must be a resetting of the counters in this apparatus as well. Transients also produce spurious counts.

The Coulter-Hogg Aperture Viewing Application discloses a counting and sizing apparatus which uses a projected image of the aperture to enable the user to observe whether debris has become lodged therein. This requires the use of a relatively strong source of illumination. As in other particle counting and sizing apparatus, a cathode ray oscilloscope is used to observe the signal pulses and its base line trace is normally in a brightened condition during the use of the apparatus.

The invention herein provides the following functions, all of which are capable of being used in connection with apparatus of the construction disclosed in the Coulter-Hogg Aperture Viewing Application, and most of which are capable of being used in practically any device operating in accordance with the Coulter principles:

(1) The aperture current is automatically turned on when the mercury is moved past the START electrode in the direction toward its cocked position, the metering zone being empty, and continues to remain flowing in the aperture when the stopcock is closed and as mercury moves toward and commences filling the metering zone. When the mercury reaches and passes the STOP electrode the aperture current is cut off. At this point, the run is completed, but when the manometer is re-cocked, the mercury moves in the opposite direction. Current still remains cut off until the START electrode is once more passed and electrically isolated, at which point the aperture current automatically is re-established.

(2) The counters retain whatever count they had registered on them as the mercury is drawn into the reservoir branch of the manometer through the metering zone and as the mercury breaks contact with the STOP electrode, but as soon as the mercury passes out of the metering zone and breaks contact with the START electrode, the counters automatically reset to zero.

(3) The amplifier gate is unblocked for conducting automatically for the period of time that the mercury is moving from the START electrode to the STOP electrode and at that instant it becomes blocked. It remains blocked for the period that the mercury is drawn back through the metering zone passing from the STOP electrode to the START electrode.

(4) The intensity of the light source serving the projection system is automatically decreased by the same means that cuts off the aperture current and it remains in dimmed condition as long as there is no aperture current.

(5) The trace of the cathode ray oscilloscope is automatically driven off the face of the cathode ray tube by a suitable deflection voltage by the same means that cuts off the aperture current and it remains off the tube face so long as there is no aperture current.

It will be seen that the operation of the structure disclosed in the Coulter Control Circuit Application can be considerably augmented and improved by the invention herein, so that the resetting of the counting devices is automatic, and the re-establishment of the flow of aperture current is also automatic at the proper and appropriate time. The means for accomplishing the functions according to the invention herein are simplified and economical.

In addition to the functions mentioned above, the invention herein teaches the use of means to prevent the apparatus from registering as counts the transients which occur at switching conditions, as for example, when the mercury makes or breaks contact with one of the electrodes.

Means may also be provided for periodically reversing the polarity of the aperture current flow each time that a simple run has been made.

Many objects and advantages of the invention not specifically mentioned will occur to those skilled in this art as a description thereof proceeds, in connection with which preferred embodiments have been illustrated diagrammatically in the accompanying drawings and explained in the accompanying text.

Generally, the invention comprises particle counting and sizing apparatus in which the aperture current is applied at the appropriate times, the counters are reset at the appropriate times, the count pulses are passed to the counters at the appropriate time, and several other functions are performed, but all of this being done automatically. The operator must have the proper suspension, place it in the vessels, see that everything is in proper adjustment and order, and energize the apparatus. At this point, aside from making the readings or changing the sample solution, the only manipulation that the operator need do is to turn the stopcock controlling the external vacuum to off or on position. Everything else is performed automatically by the apparatus.

Figure 2:
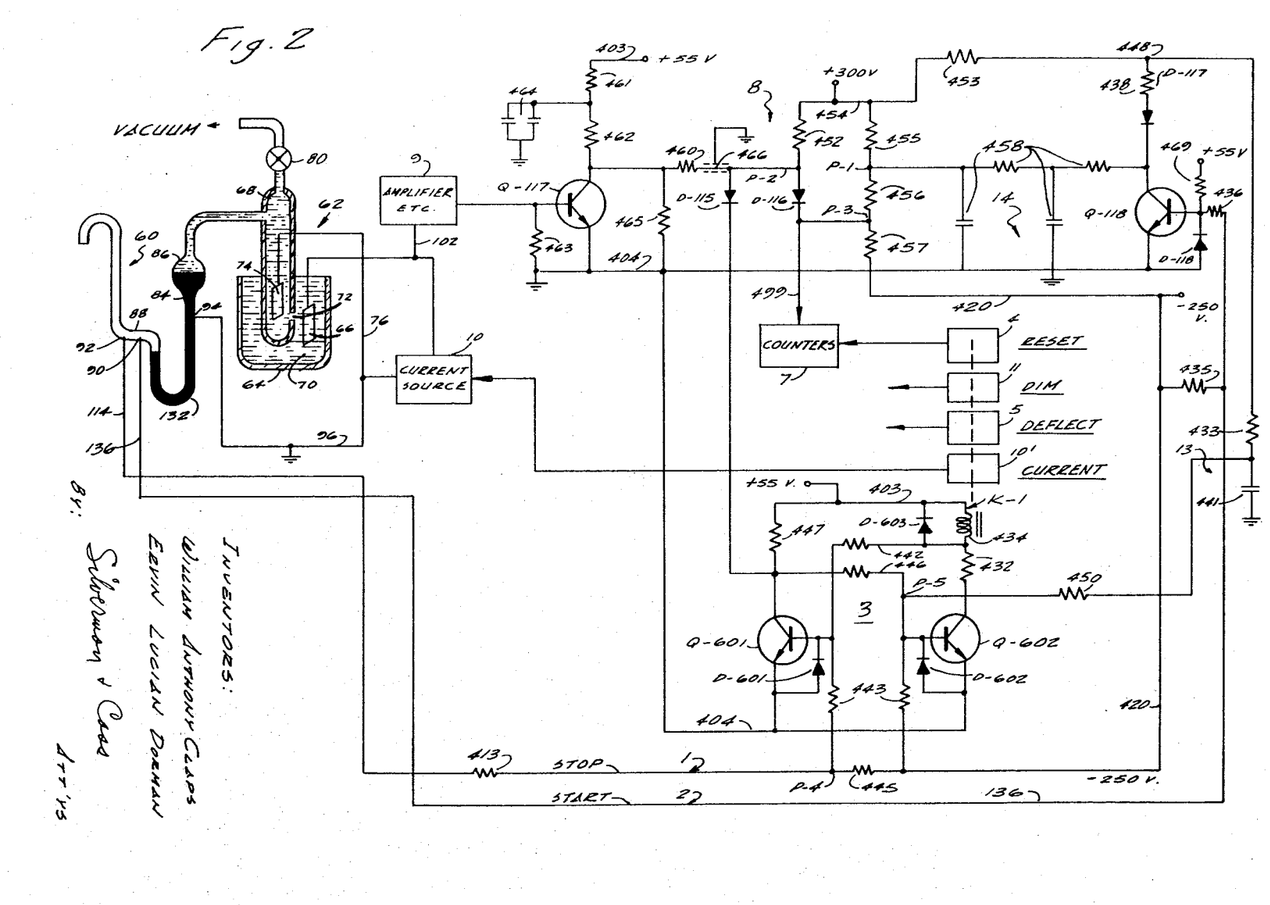
FIG. 2 is a combined block and circuit diagram of the portions of the apparatus of FIG. 1 which are involved in the invention herein.
Figure 4:
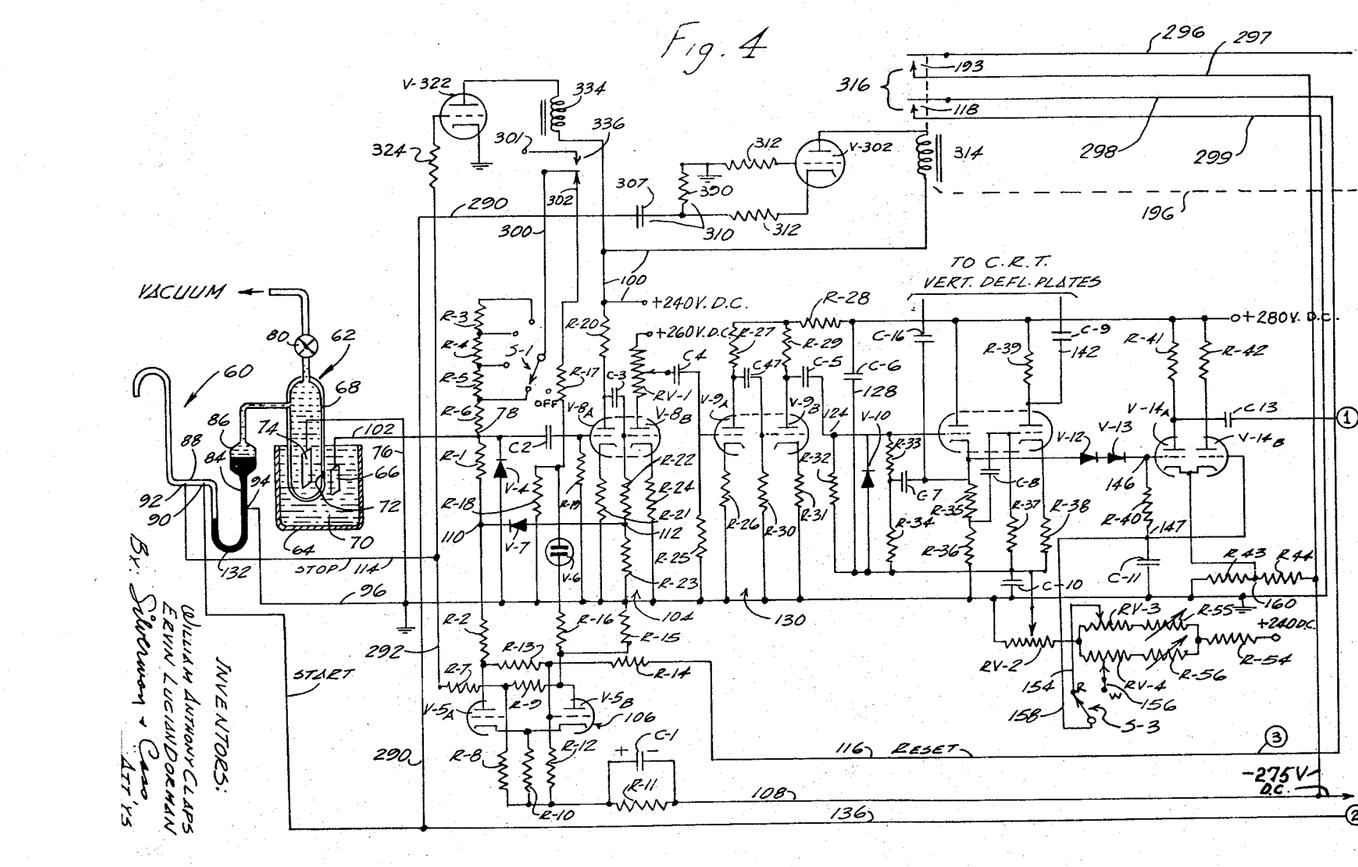
FIG. 4 and FIG. 5 combined comprises a detailed schematic diagram of the structure disclosed in the Coulter Control Circuit Application, but improved in operation and function according to the teaching of this invention.

The Coulter apparatus has an assembly of parts which is known as a stand. It supports the beaker, aperture tube, glassware, vacuum pump and much of the external paraphernalia which comprise the pulse producing means and manometer system. In some apparatus, the stand is built into the same cabinet with the electronic circuitry and there are illuminating devices, optical systems, microscopes, and the like associated with the pulse producing means. Most of the apparatus which is identified as the manometer 60, the signal source 62, the stop circuit 1, the start circuit 2, and the associated parts, will be carried on the stand, which is not shown as such. The left hand diagrammatic portions of FIGS. 2 and 4 give a fair representation of the details.

Figure 1:
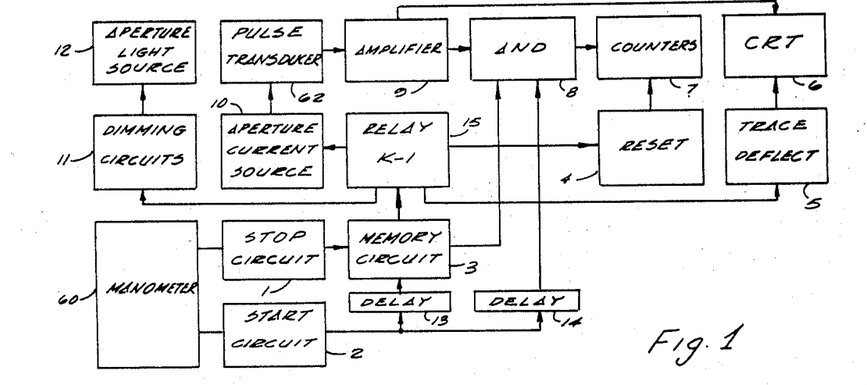
FIG. 1 is a block diagram of a particle counting and sizing apparatus generally showing some of the components thereof to illustrate the functions which are provided by the structure of the invention herein.

The theory and operation of the apparatus are best studied in connection with the patents and applications which are mentioned above, hence these details need not be explained at this point. For the most lucid explanation of the invention attention is invited to FIGS. 1, 2 and 3. FIG. 1 is a simplified block diagram of the important parts of the apparatus of the invention; FIG. 2 is a simplified circuit diagram of the control portions of the apparatus; and FIG. 3 is a graph which attempts to illustrate the functions performed in sequence.

Perhaps the key factor to appreciate before examining the invention in detail is that the functions which are to be performed by the apparatus are different for each direction of movement of the mercury in the manometer. These two directions represent movement of the mercury from a balanced or quiescent condition to a cocked or unbalanced condition, on the one hand, and the movement of the mercury from its cocked or unbalanced condition back to its quiescent condition on the other hand. Initially, it is understood that the counting must be done while the mercury is returning to its balanced condition, this being taught by the Coulter Metering patent. The other functions are required somewhat as previously discussed. The device which takes this key factor into account is the memory circuit 3, a simplified form of which is a binary or flip-flop circuit triggered to assume one state or another. In the Coulter Control Circuit Application, a stop flip-flop circuit acted somewhat as a memory circuit, but was deficient in that once it had been activated to a given state it was necessary to apply a triggering pulse manually in order to cause it to assume its other state, this being done by a reset switch.

In the instant invention, the memory circuit operates automatically, performing different functions depending upon the direction in which the mercury moves.

Figure 3:
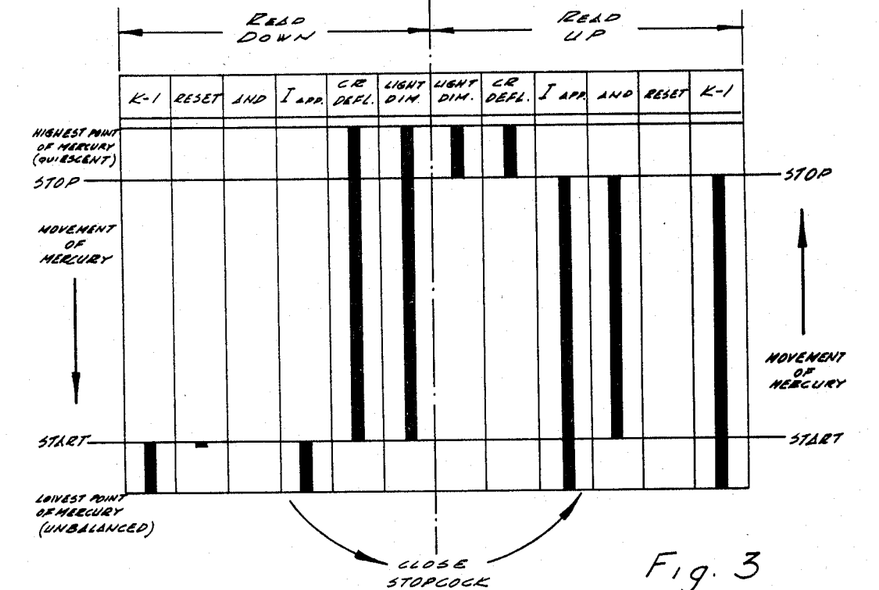
FIG. 3 is a graph illustrating the sequential performance of the various parts of the apparatus of the invention.

Looking now at FIG. 3, there are two halves to the graph, the left half representing the functions performed by various parts of the apparatus while the mercury moves from its highest to its lowest points past the STOP electrode 92 and the START electrode 90. These highest and lowest points are chosen arbitrarily for this diagram, and could be any points beyond the electrodes in a direction away from the metering zone, which is here defined as that portion 88 of the manometer 60 between the START and STOP electrodes. In the instant case, the control zone is the same as the metering zone, but under certain circumstances, it may be desirable to initiate certain circuit functions through the use of auxiliary electrodes outside of the metering zone, such as for example immediately adjacent the respective START and STOP electrodes. Delay circuits, enabling circuits, unlocking circuits and the like independent of the particular combined circuits shown can be operated by these auxiliary electrodes, in addition to the START and STOP electrodes, without doing violence to the invention as described herein. One example could use teachings of the Henderson Control Circuit application.

Because of this, reference in the claims to "control zone" should be taken to include the feasibility that control can be exercised in an extent of movement of the mercury greater than within the metering zone. Likewise, "electrode means" as used in the claims does not exclude the use of more than a single electrode at the ends of the control zone, although in the instant case the electrode means comprise a single electrode at each end.

Continuing with the explanation of the graph of FIG. 3, the halves each have six columns, the left half reading downward and the right half reading upward. The absence of a bar in a column indicates that the particular circuit or component identified at the head of that column is not operating or energized. Thus, in the first column of the left hand side, headed "K–1" there is no bar until the START level.

This means that the relay K–1 of FIG. 2 is not energized as the mercury 84 moves in its manometer 60 from quiescent condition toward the START electrode 90, but will be energized when the mercury finally withdraws from contact with the START electrode. Since the bar continues down this column to the unbalanced condition, obviously the relay K–1 remains energized for this period of movement.

In a similar manner, the reset means 4 will produce only a short pulse after the mercury has reached and dropped below the START level, that is, has left the START electrode 90 on its way to the unbalanced or cocked condition. The AND gate 8, which controls the transmission of particle signals to the counters 7 is seen not to operate at all during the downward movement of the mercury. The aperture current source 10 is operated to cause flow of aperture current between the electrodes 74 and 66 through the aperture 72 commencing when the mercury column has broken contact with the START electrode 90 and remains operative to the point of maximum unbalance. The two columns remaining indicate that the cathode ray tube 6 has the base line trace deflected by the deflecting means 5, and the aperture illuminating source 12 is dimmed by the circuit 11 when the relay K–1 is not energized, and vice versa. As shown in FIG. 2, the means for performing the four functions of reset of counters to zero, dimming and brightening the light source, deflecting and returning the base line trace, and applying or cutting off the aperture current comprise suitable make-break contacts of the relay K–1 and circuits connected therewith. There will be some slight delays at the START level, but these are explained below. The relay K–1 will be energized only after transient pulses have been filtered or delayed prior to reset.

Considering the right hand side of the graph of FIG. 3, the column K–1 shows a bar from the bottom up to the STOP level, which means that when the operator turns the stopcock 80 to disconnect the manometer and enclosed fluid system from the external source of vacuum, and the mercury commences to move along the manometer tube toward its balanced condition (upward in FIG. 3), the relay K–1 will remain energized until the mercury reaches the STOP electrode 92. At this point the relay K–1 will be de-energized and remain in this condition so long as the mercury is moving toward its balanced condition from the STOP electrode 92 or is at balanced condition. The LIGHT DIM and CR DEFL. columns show energizing conditions opposite to those of the relay K–1. The aperture current column $I_{APP}$ shows that current flows through the aperture 72 for the period that the mercury moves toward a balanced condition but is shut off after the STOP electrode has been passed. No reset signal is produced in this movement.

The memory circuit 3 of FIG. 1 may be a two state flip-flop circuit receiving enabling signals from the STOP circuit 1 and the start circuit 2. It will assume state Two only when the START circuit triggers it and will maintain that state until the STOP circuit triggers it to change to state One. In state Two it energizes the relay K–1 and in state One it de-energizes the relay K–1. The relay K–1 operates to produce the functions mentioned with suitable interposed delays, if desired. Delay means are shown at 13 and 14, for example. The reset means 4 may be any suitable pulse producing device such as a condenser discharge circuit. The AND gate 8 controls whether or not the pulses from the amplifier 9 will be counted. All three inputs to the AND gate must be present for an output to occur. The input from the amplifier 9 can only obtain when the aperture current is flowing; therefore, according to FIG. 3, there will be no output from the AND gate 8 while the mercury moves from quiescent condition to the START electrode 90. In this movement, the mercury passes the STOP electrode 92, but this has no effect upon the memory circuit which is in state One other than to unblock the flip-flop circuit so that its state may be changed to state Two at the START electrode 90.

Now, as soon as the mercury passes the START electrode on its way to unbalanced condition, there is no signal from the START circuit 2, since the START electrode is isolated from the mercury column, and this condition obtains all the while that the mercury passes to its unbalanced condition from the START electrode. It also remains in this condition when the operator closes the stopcock 80 to permit the mercury to run back in the opposite direction, up to the instant that the mercury makes contact with the START electrode going in the direction toward balance. At this point, the START circuit provides a signal input on its connection to the AND gate, with slight delay to permit switching transients to decay, and at the same time the memory circuit 3 is providing what is, in effect, an input signal being in state Two, so that the AND gate 8 produces an output. Pulses will be applied from the amplifier all the time that aperture current flows.

When the stop circuit 1 switches the memory circuit to its off state, i.e., state One, the AND gate is turned off and no more counting ensues.

The circuit diagram of FIG. 2 illustrates a practical embodiment of the control circuitry of the invention, utilizing semi-conductor techniques. In this FIG. 2, a manometer metering section or zone 88 having START and STOP electrodes 90 and 92 is shown. The manometer 60 has its left hand end open to the atmosphere and the right hand end of the conduit provided with the lower bend 132, and connected through the reservoir 86 to the closed system which includes the vessel 68. The aperture 72 in the side of the vessel 68 is the only physical and electrical path between the test sample 70 in the beaker 64 and the electrolyte in the vessel 68. The platinum electrodes 72 and 74 connect respectively to the detector and ground by way of the leads 102 and 76, respectively. The current source is shown as a block 10 connected between the electrode 66 and ground. The detector will include amplifiers, pulse shapers, circuits for cathode ray tube display and other refinements, but for the purpose of simplicity, will be referred to by the block 9 and designated amplifier. The stopcock 80 is a valve which is the only manual device to be manipulated by the operator for making sample determinations, all the functions desired being performed automatically by the control circuitry of the invention.

Leads 136 and 114 respectively associated with the START and STOP electrodes are connected to a —250 volt source 420, as shown, by way of isolating resistors 413, 435 and resistor 445. A common +55 volt bias lead 403 and a common ground lead 404 are provided. NPN transistors Q–118 and Q–602 are connected in circuit for providing control signals in response to the contacting of the START and STOP electrodes 90 and 92 by the grounded mercury column passing through the manometer metering zone 88. This action has been described generally above.

For each of the transistors Q–118 and Q–602, isolating diodes D–118 and D–602 are provided respectively in the base-emitter circuits as shown. The diodes, poled as shown, permit large signals to be applied to the respective transistors without damaging the same. Transistor Q–601 is similarly protected.

A relay K–1 having a plurality of contact circuits 4, 11, 5 and 10', shown as blocks in the view, has its operating winding 434 connected between the +55 volt lead 403 and the collector electrode of transistor Q–602 by way of collector resistor 432. Diode D–603, poled as shown, is connected across this winding for protecting the transistor Q–602 by clamping the collector to +55 volts. Base biasing resistors 443 and 436, respectively, are connected to —250 volt lead 420 as shown, and to the STOP and START electrodes. The base electrode of transistor Q–602 is connected to the collector electrode of transistor Q–118 by way of series connected resistors 433 and 438 and forwardly poled diode D–117.

Series voltage dividing resistors 442, 443, 445 are connected from one terminal of relay operating winding 434 to —250 volt lead 420. Capacitor 441 provides a potential reservoir in connection from ground through resistors 433, 446, 447 to +55 volt lead 403.

NPN transistor Q–601 provides a conduction path, as shown, from resistor 447 to ground lead 404 and is connected in series through resistor 443 to the —250 volt lead 420. Lead 454 is connected to a source of +300 volts. Voltage divider resistors 455, 456, 457 are connected in series between lead 454 and lead 420. Two L capacitor-resistor filter sections 458 are connected from a point P–1 between resistors 455 and 456 to the collector electrode of transistor Q–118.

Input NPN transistor Q–117 provides a conduction path from +55 v. lead 403 to ground lead 404 by way of series collector resistors 461 and 462 between which parallel connected filter capacitors 464 are connected to ground.

A suitable biasing resistor 465 is connected between the collector electrode and the grounded emitter electrode of the input transistor Q–117 for applying an output signal by way of shielded lead 466 to the junction P–2 between opposed diodes D–115 and D–116. The former is forwardly poled and connected to the collector electrode of the transistor D–601 and the latter diode D–116 is forwardly poled to the midpoint P–3 between divider resistors 456 and 457.

Input particle indicating pulse signals are derived from the pulse transducer 62, comprising the pulse producing parts of the stand and amplified or otherwise operated upon in the amplifier 9. They are then applied to the base electrode of the transistor Q–117. From the transistor Q–117 the signals are passed to the said junction P–2 between the diodes D–116 and D–115 for further application by way of the lead 499 to some count indicating arrangement such as the counters 7 of FIG. 1. The diodes D–115 and D–116 comprise the AND gate 8 with the input from the amplifier 9 applied through the resistor 460, the memory circuit input being controlled by diode D–115, and the START circuit input being introduced at the point P–1.

The above comprises a somewhat general outline of the principal components of the control circuitry. The functioning of the components will be described below, such description commencing with the assumption that a particle analysis determination has been just completed. With this assumption, the START and STOP electrodes 90 and 92 both are in electrical contact with the grounded mercury column 84 of the manometer metering zone 88.

The condition is that which obtains in the upper left hand corner of the graph of FIG. 3. The memory circuit 3 is in state one and the relay K–1 is de-energized. The mercury is in balanced or quiescent condition. Opening the stopcock 80 will cause the mercury column to commence receding in its conduit away from the atmospheric opening toward the reservoir end, the mercury moving down into the bend 132. It need not proceed much past the START electrode in this complete movement which will carry the mercury to a position represented by the lower left hand corner of the graph of FIG. 3.

Transistors Q–601 and Q–602 as indicated, of the NPN type, are connected in a flip-flop configuration, forming the two state memory circuit 3. As transistor Q–602 conducts, actuating current flows through winding 434 of Relay K–1. In the assumed quiescent condition, however, transistor Q–601 is held on, i.e., in a conducting condition, by the positive base potential applied by voltage divider action through resistors 443 and 442. Connection from the collector electrode of this transistor Q–601 through resistor 446 thus maintains transistor Q–602 in the non-conducting condition. In addition, the base of transistor Q–118 is effectively grounded through its connection 136 with the START electrode 90 and is conducting. Its collector is at a very low voltage bringing the voltage at the collector of transistor Q–601 to a low value and assuring that it is cut off.

As the mercury is drawn to the right, as viewed in FIG. 2 or down on the left side of FIG. 3, corresponding to preparation for a new particle analysis operation, first contact with electrode 92 is broken. Thus, this electrode is no longer grounded through the mercury and electrode 94. The point P–4 is now no longer grounded so that the memory circuit 3 can be triggered to change to state Two at the appropriate time. This passing of the electrode 92 by the mercury column obviously will have no effect to actually change the state of the memory circuit 3.

Now, as the memory column 84 recedes further to the right as viewed in FIG. 2 (down on the left side of FIG. 3) it will pass and break contact with the START electrode 90. The collector of the transistor Q–118 will now go positive to a high voltage—say +125 volts. The disconnect diode D–117 isolates the circuits of the transistors Q–118 and Q–602. The point P–5 at the base of the transistor Q–602 will go positive and Q–602 will conduct. The transistor Q–118 is cut off because the base was driven negative when the START electrode 90 was isolated by the mercury column. When the transistor Q–118 turned off, the collector electrode of this transistor rises in potential, as explained above, to back bias the diode D–117 and drive the point P–5 positive. This conducting condition of the transistor Q–602 is now coupled by way of the resistor 442 to the transistor Q–601 and cuts it off. Q–601 was conducting in the state One and this served to short circuit all pulses from Q–117 through the diode D–115, preventing the count pulses from reaching the AND gate 8. In effect, there was an "input" missing from the AND gate. When the transistor Q–601 is cut off as the memory circuit assumed state Two, transistor Q–601 back biases the diode D–115 so pulses from amplifier 9 will be applied to the AND gate.

With the transistor Q–602 conducting, the relay winding 434 is energized and all circuits of the contact elements of relay K–1 change. These may be variously normally open or normally closed, depending upon the function demanded. One set of contacts designated 4 produces a pulse to reset the counters 7 to zero. Another set 11 brightens the aperture light source 12. Another set 5 returns the deflected base line of the cathode ray oscilloscope to the screen of the cathode ray tube. Another set 10′ starts the flow of current in the aperture 72.

Now, since there is a grounded by-pass condenser 441 connected to the lead between the collector of Q–118 and the base of Q–602 at the point P–5 (through an isolating resistor 450), the base of Q–602 will not go positive until after the condenser 441 charges. This delays the operation of the relay K–1 by a short interval. The reset pulse aperture current start and all functions controlled by energizing of K–1 are accordingly slightly delayed after the START electrode has been passed. This delay prevents the counters 7 from counting noise and transients because the reset pulse is also delayed until the circuit stablize after the switching phenomenon associated with breaking contact between the mercury and the START contact 90. Reset pulse is produced in a suitable circuit (not shown) as a short single pulse, as for example by the discharge of a condenser, but only after the transients have decayed. If the reset were operated immediately when the START electrode is passed, there might be counts thereafter applied to the counters 7 which represent only noise.

Now, the mercury manometer is cocked, being in an unbalanced condition. This is that condition illustrated in FIG. 2, and represented by the lower left hand side of FIG. 3. Now the operator closes the stopcock 80 and this is represented in FIG. 3 by the arrow shifting attention to the lower right hand end of the graph. Now the mercury starts to rise up the bend 132 and move to the left in the manometer as viewed in FIG. 2. This is equivalent to moving up the right hand side of the graph of FIG. 3.

As the mercury starts moving toward balanced condition (the top right hand end of the graph of FIG. 3), the memory circuit is in state Two with the relay K–1 energized. It will remain energized for the time indicated by the bar in the right hand K–1 column. The passing of the START contact 90 causes pulses from the amplifier 9 to be applied to the AND gate through the transistor Q–117, but the filter sections 458 delay the arrival of the START signal until contact transients have decayed. The counting commences thereafter, and continues until the STOP electrode is reached by the mercury. At this point Q–601 suddenly conducts, but Q–602 cuts off. Isolating resistor 420 prevents any delay in this action. The memory circuit 3 flips over to state One, counting stops immediately and the aperture current is cut off. The aperture light source is dimmed and the CRT base line deflected off its screen to keep from burning the phosphors while the mercury is in balanced condition.

The cycle having been completed, the counters are read, and for the next determination all that the operator need do is once more to open the stopcock, wait for the mercury to move to its unbalanced condition and close the stopcock.

Figure 5:
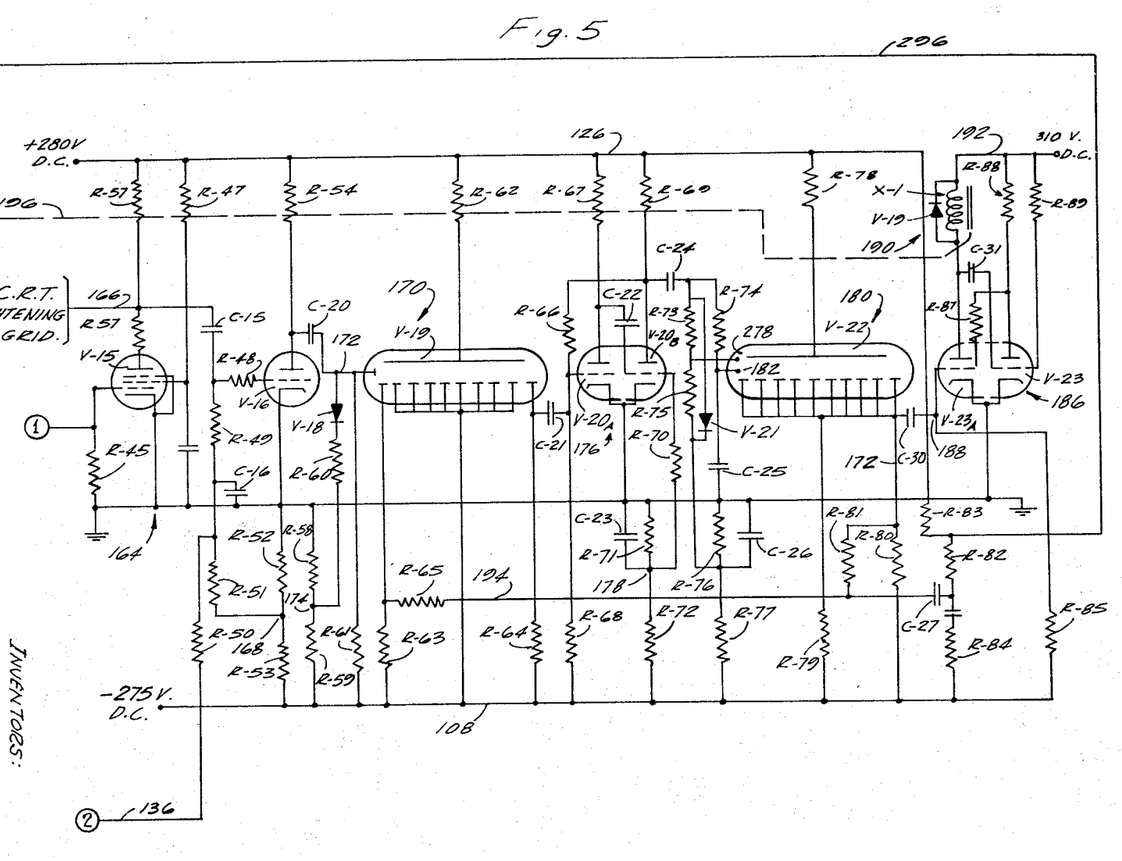

It will be appreciated that the operations and functions described are all automatic and accomplished by simple and effective circuitry. It will also be obvious that the teachings of the invention are equally capable of being applied to apparatus which utilizes electronic tubes instead of semi-conductors. FIGS. 4 and 5 illustrate this in connection with the description below. The basic apparatus is quite similar to that disclosed in the Coulter Control Circuit application.

In the schematic diagrams of FIGS. 4 and 5, designating numerals corresponding to those of FIGS. 3a and 3b of the Coulter Control Circuit application have been employed for designating common structural elements and the cooperative interaction of these elements is as discussed in that application. These important distinctions exist. The lead 114 associated with the STOP electrode 92 is extended to another tube V–322 by way of lead 292. Similarly, the lead 136 associated with the START electrode 90 is extended by way of lead 290 to a tube V–302. Further, the aperture current supply from the illustrated +240 volt D.C. source by way of lead 100 is connected, in accordance with the present invention, through leads 300, 302, as illustrated. Further, the reset switch S–2 of said application is replaced by lead pairs 296, 299, and 297, 298. Still further, the mechanical linkage 196 of that prior application is modified, as indicated in FIG. 4, for association with relay 316.

Before proceeding further with examination of the modifying structures of the present invention, it may be well generally to review the operational function of the structures of said Coulter Control Circuit application which are shown in FIGS. 4 and 5.

In FIG. 4 there is shown diagrammatically a substantially conventional +240 volt D.C. supply connected in circuit with the lead 100 for supplying a direct current to the electrode 66 disposed in the body of the liquid suspension 70 defined by the insulated vessel 64. The current supplied is intended for passage through suspension 70 by way of aperture 72 to the interior of the second insulative vessel 68 which defines the second body of liquid. All of the other parts of the manometer 60 and pulse producing means 62 are the same as to construction and operation with those shown in FIG. 2. Ground potential here is designated 96, as in FIG. 2.

Appropriate detecting means, including tubes V–8$_A$, V–8$_B$, are connected in circuit with the aperture 72 for deriving electrical signals indicative of the passage of suspended particles through the aperture. The so-derived particle signals are processed in appropriate circuitry associated with the noted tubes.

As the mercury column 84 passes the START electrode 90, in moving toward a balanced condition, that START electrode is established at ground potential by virtue of the grounded electrode 94 which contacts the mercury column 84 in common with the START electrode 90. In one preparatory apparatus condition, with the mercury column unbalanced as shown, the lead 136 associated with the START electrode 90 is at a negative potential for holding shut an amplifier and gate tube V–16 in the pulse processing channels illustrated. In one representative set of circumstances, the lead 136 and electrode 90 are held at a negative potential of approximately —18 volts. Thus, as the mercury column 84 comes into contact with the electrode 90, an effective +18 volt pulse is applied to the lead 136. This serves to enable conduction by the prior cut-off-biased amplifier and gate tube V–16. Particle analysis signals arriving at the amplifier and gate tube V–16 are thus passed through appropriate processing channels in accordance with the said Coulter Control Circuit application for providing particle indicating signals to counter 190.

Thereafter, as the mercury column 84 advances along metering section 88 further to engage the second or STOP electrode 92, this latter electrode is similarly established at ground potential by way of the mercury column 84 and electrode 94. Now the lead 114 associated with this STOP electrode 92, is quiescently at a relatively low negative potential by virtue of connection to the plate electrode of tube V–5$_B$ which is conductive during the interval that the mercury passes through the metering section 88 of the manometer 60. In accordance with the disclosure of said Coulter Control Circuit application, there is a relatively low negative potential on the lead 114. This large positive pulse endures so long as the STOP electrode is connected to ground electrode 94 by way of the mercury column. Opening of this connection effectively applies a cancelling negative pulse to lead 114.

Concomitant with this mercury flow along the metering section 88, pulse signals are derived at the connection point 78 for amplification in appropriate processing channels.

Up to this point, the structure described is common with said application. As previously mentioned, that apparatus was provided with a manually operable reset switch for resetting the glow counter tubes V–19 and V–22 and the mechanical counter 190 to a zero condition before commencement of an analysis operation. Further, in accordance with said application, without proper manual operation of switch S–1, aperture current would be supplied for flow between electrode 66, 74 through suspension 70 with accompanying problems. Further, failure to reset the glow counter tubes and mechanical counter 190 to a zero condition prior to commencement of another analysis operation is undesirable.

In accordance with the present invention, the positive pulse appearing on lead 136, as a result of the manometer mercury contacting electrode 90 is coupled by way of lead 290 to capacitor 307 and resistor 309, the two of which together combine to form a differentiating circuit 310. Thus, on opening of contact between electrode 90 and mercury 84, a negative signal appears at the START electrode and is coupled to lead 290. The lead 290 is connected by way of the differentiating circuit capacitor 307 to the cathode electrode of a tube V–302 by way of a resistor 312. Thus, a very short duration differentiated negative pulse is applied to this cathode electrode for enabling conduction by tube V–302.

An actuating winding 314, for multiple contact relay 316, is connected by way of the lead 100 to a source of +240 v. positive potential for the tube V–302. The resistor 312 is a cathode biasing resistor and is chosen of suitable value such that the tube V–302 is normally in a cut-off condition. Thus, the contacts of relay 316 are normally in the de-energized position illustrated. Accordingly, as shown, leads 296, 298 are respectively open-circuited from the companion leads 297, 299. These latter leads, respectively, are connected, as shown, to —275 volt lead 108 and ground lead 96. Hence, in the condition shown, an open circuit appears on the reset lead 116 for tube V–5$_B$ and on the lead 194 for re-establishing the counter tubes V–19, V–22 at an initial condition as discussed in the referenced copending application. At the same time either a mechanical or electrical coupling 196, illustrated by dashed lines in linked association with the actuated arms of relay 316, remains in a condition such that the mechanical counter 190 is operative. Operation of the relay 316 to a position opposite that illustrated, concurrently acts through coupling 196 to reset the mechanical counter 190 to zero.

Let us now examine the function of the differentiator circuit 310 in accordance with the invention, as this circuit cooperates with the electrode 90 and the mercury column 84. It has been observed that the resistor 312 biases the tube V–302 to a non-conducting condition. Thus, no current flows through the relay actuating winding 314. Now as the mercury column 84 advances within the manometer 60 to the metering section 88 positioned between electrodes 90 and 92, this mercury column first contacts electrode 90. Since lead 136, as previously noted, is at a negative potential, at the contacting of electrode 90, the START electrode effectively connects this erstwhile negative lead 136 to ground by conduction through the mercury to the electrode 94.

Thus, effectively, a positive pulse is applied to lead 290 and to the cathode electrode of tube V–302. This tube is non-conducting by virtue of the cathode biasing action of resistor 312. The differentiator circuit 310 only increases this non-conducting bias as the mercury column contacts electrode 90 and relay 316 remains in the condition illustrated. According to the copending application, when tube V–5$_B$ conducts, the input amplifier tube V–8 is conditioned for passage of particle indicating pulse signals therethrough. Particles passing through the aperture give rise to pulse signals through the signal processing channels which drive counter 190 and other illustrated indicating circuits.

All this time voltage divider action between —275 volt lead 108 and +240 volt lead 100 establishes lead 114 at a negative potential, say —35 volts.

Now the mercury column engages electrode 92 to indicate that a precisely metered quantity of suspension 70 has passed through the aperture 72. The lead 114 is established at ground potential through mercury column 84 by virtue of the engagement of electrode 92. Effectively, a positive signal is coupled to lead 114 and to connected lead 292 in accordance with the invention. The useful work of the particle analyzing apparatus is now completed for one analysis operation.

Now the positive signal (this is relatively a positive signal but actually is a ground signal) on lead 292 is coupled to the grid electrode of triode V–322 by way of resistor 324. The lead 292 having been previously negative by virtue of connection to lead 114, this tube is driven now from cut-off to conduction as the mercury contacts STOP electrode 92.

Thus, operating current flows through this tube by way of an operating winding 334 of relay 336.

This conducting condition of the tube V–322 opens the contacts of relay 336 and, thus, interrupts passage of current from the +240 v. D.C. source indicated to lead 300 and, by the paths illustrated, through the aperture 72.

Accordingly, further particle indicating pulse signals are no longer capable of being derived for passage through the illustrated signal processing channels.

In the said copending application, the contacting of STOP electrode 92 by the mercury column leads also to the switching of bi-stable device 106 and provides a low impedance bypass for current through a path including tube V–5$_A$ to inhibit current flow through the aperture 72. In accordance with the present invention, however, such aperture current passage is positively precluded by action of the relay 336.

Now the one analysis operation having been completed by the mercury column contacting STOP electrode 92, there remains the problem of accurately and expeditiously effecting still further particle analysis. In accordance with the invention this is easily reliably and automatically accomplished.

As the stopcock 80 is opened to the vacuum source, the mercury column is withdrawn to the right in the manometer metering zone 88. As contact with the STOP electrode 92 is broken, lead 114 is restored to a negative potential. Thus tube V–322 is again cut off stopping current in winding 334. Relay 336 is restored to establish an electrical connection from the +240 volt D.C. source to lead 300 and, through the indicated resistors, e.g., resistor R–6, through the current path in suspension 70 between electrodes 66, 74 by way of aperture 72.

Passing still further to the right, the mercury column under influence of the vacuum applied through valve 80 breaks contact with START electrode 90. Lead 136, and connecting lead 290, are thus restored from ground potential to a negative potential. This restoration corresponds to the propagation of a negative pulse along the two leads.

This negative pulse is differentiated in circuit 310 to derive a sharp negative pulse and applied to the cathode electrode of tube V–302 through resistor 312. The grid of this tube being grounded through resistor 313, the operating winding 314 of relay 316 is energized by current flow through V–302. The contact arms of relay 316 are thus thrown from the open position shown to establish connection between leads 296, 297 and 298, 299. Simultaneously, the coupling 196 is activated to reset the mechanical counter 190 to zero. Connection of leads 296 and 297 will reset the glow counters V–19 and V–22 to zero.

Thus, reset lead 116 is connected to ground lead 160 through leads 298, 299 for turning on tube V–5$_B$ and, with this, turning off the companion tube V–5$_A$ in the bistable circuit 106.

At the same time, the lead 296 is connected directly to the —275 volt D.C. lead 108. Thus, a resetting negative potential is applied to the glow counter tubes V–19, V–22. Following these operations, the particle analysis and indicating circuits of the invention are reset automatically to a ready condition for the next analysis. All that need be done is once more to close stopcock 80, and allow apparatus in accordance with the invention to proceed for deriving unequivocal and unambiguous particle signal indications as on counter 190. Other functions can be performed by operation of relay 316.

The two embodiments of the invention which have been described herein point up the fact that the invention is capable of being carried out in many different forms and with many different variations without, in any way, departing from the spirit or scope of the invention. Functions may be added to the circuits opened or closed by the relays of the respective circuits. Thus, one important function that has been required in Coulter Counters has been the reversal of the polarity of the aperture current with each run to prevent the effects of polarization. A simple set of of contacts on the relay K–1 provides this switching function if desired. Further, the make or break of contacts can be used to provide a signal for a circuit which is not energized until another electrode is contacted by the mercury. For example, an AND circuit having one input established from an auxiliary electrode and another from the relay K–1 may produce a delayed output to perform a function such as lighting a light, or even causing a substantial delay in establishing the aperture current, etc. This was previously indicated herein, and it is mentioned here merely to show that the invention has great versatility.

What it is desired to secure by Letters Patent of the United States is:

1. Apparatus for analyzing the physical properties of particles suspended in a conductive vehicle liquid having electrical properties distinct from like properties of said particles which comprises a first fluid chamber adapted to hold a first body of conductive liquid therein, a second fluid chamber adapted to hold a second body of conductive liquid therein, said chambers being substantially electrically isolated one from the other but having a minute passageway therebetween through which liquid and an electrical current may be caused to flow, at least said first body adapted to have said particles suspended therein and its conductive liquid comprising said vehicle liquid, a manometer siphon comprising a high density fluid in fluid pressure engagement with said second body for causing flow of said vehicle liquid from said first body through said pasageway to the said second body when in siphoning operation, said siphon including a conduit for flowing movement of said high density fluid, means in said conduit defining a control zone which includes at least a metering portion, and the high density fluid adapted to flow into and at least fully throughout all of said zone in one direction during siphoning operation, but adapted to flow in the opposite direction to empty the zone during an unbalancing operation, and electrical current source connected to said bodies for passing an electric current between said bodies by way of said passageway, a detector electrically coupled with said bodies for deriving electrical signals indicative of the passage of particles through said passageway, a two state control device adapted to be alternately placed in a first state or a second state depending upon the direction of movement of the high density fluid and the location thereof, a circuit make-break device adapted to be energized by the control device when in said second state and deenergized when in said first state, the circuit make-break device having means for connecting said source of current to said bodies when in said second state and disconnecting said source when in said first state, first means for switching said control device from its second state to its first state when the high density fluid moves in said one direction but only after having fully filled said control zone, and second means for switching said control device from its first state to its second state when the high density fluid moves in said second direction, but only after having fully emptied the control zone.

2. Apparatus as claimed in claim 1 in which said high density fluid is electrically conductive, said means in said conduit for defining said control zone comprise at least two spaced electrodes, one or both adapted electrically to contact said high density fluid when said fluid is in said control zone and said first and second switching means including said contacts and said high density fluid.

3. Apparatus as claimed in claim 1 in which said high density fluid is electrically conductive and adapted to be connected with said two state control device, said means in said conduit comprise a first electrode means adapted first to be electrically engaged by said high density fluid as it moves in said one direction and second electrode means spaced along said conduit from said first electrode means and adapted to be electrically engaged by said high density fluid after having at least passed through all of said metering portion, said apparatus including counting means having a start circuit connected electrically to said first electrode means and adapted to be placed in operation by the contacting of the high density fluid with said first electrode means while moving in said first direction, and a stop circuit connected electrically to said second electrode means and adapted to be placed in operation after said high density fluid has moved in said one direction throughout said metering portion and into contact said second electrode means, said first switching means being electrically connected with said second electrode means and said second switching means being electrically connected with said first electrode means.

4. Apparatus as claimed in claim 3 in which said electrode means each comprise a single electrode and said metering zone and control zone are identical and are defined between said electrodes, the said stop and start circuits being connected to separate electrodes.

5. Apparatus for studying the physical properties of particles in suspension which comprises, first and second vessels insulated from one another and defining first and second bodies of electrolyte, at least one of which has the particles therein and comprises said suspension, means forming an aperture between the vessels, a manometer comprising a conduit open to atmosphere at one end and having a column of conductive liquid therein in fluid pressure relationship with the other of said bodies at said other end of the conduit, a start electrode and a stop electrode in the conduit spaced apart and adapted to be electrically contacted or electrically isolated relative to the column as said column traverses said conduit, the column normally being quiescent in the manometer, unbalancing means connected with the manometer and operable to unbalance the column if quiescent to move the column toward the said other end, or operable to permit the column to move toward the atmosphere end if unbalanced, movement of the column from an unbalanced to a quiescent condition drawing suspension through said aperture from said one of said bodies to the other, a source of electrical current connected in circuit with the bodies for passing an electrical current through said aperture at a time that suspension is being drawn through the aperture, detecting means connected in circuit with the bodies to obtain signals from the passage of particles through the aperture, said detecting means including indicator means driven by said signals to register the number of signals and hence the number of particles passed, means connected with the start and stop electrodes for rendering said indicator means operative when the column is moving from contact with the start electrode to contact with the stop electrode but otherwise disabling the indiciator means so that said indicator means registers only the number of particules passing through the aperture while the column fills the conduit between start and stop electrodes, and means connected with said start electrode for automatically resetting the indicator means to zero but only as the column moves from stop to start electrode in a movement unabalancing the same.

6. The structure as claimed in claim 5 in which said last means is inoperative until the column has emptied the conduit between the stop and start electrodes while engaged in such movement.

7. The structure as clamed in claim 6 in which means are provided for connecting the source to said bodies as the column moves in the direction from stop electrode to start electrode to an unbalanced condition but only after having passed the start electrode, maintaining said connection as the column moves from unbalanced condition in the direction from start electrode to stop electrode until after the stop electrode has been passed and disconnecting said source after the column fills the conduit between electrodes and contacts the stop electrode.

8. Apparatus for studying the physical properties of particles in a liquid suspension said suspension having electrical properties different from corresponding properties of the particles suspended therein, said apparatus comprising first and second vessels insulated from one another, means providing an aperture in liquid communication between said vessels, said particles in suspension being in said first vessel, a manometer arrangement comprising a column of conductive liquid and spaced apart stop and start electrodes for defining therebetween a predetermined volume of conductive liquid, means for providing liquid communication between said column and said second vessel, means for displacing said liquid from contact with said stop and start electrodes to an unstable position, means for relaxing the influence of said displacing means on said liquid, whereby said liquid flows from said unstable position to contact said start and stop electrodes successively and draws said suspension from said first body to said second body by way of said aperture, a source of electric current connected to pass current between said first and second vessels by way of said aperture, detecting means connected in circuit with the suspension in said aperture for deriving electrical signal indications of the passage of particles therethrough, said detecting means comprising counter means responsive to said electrical signal indications for counting particles passing through said aperture, and means in circuit with said start electrode and automatically responsive to the interruption of contact between said start electrode and said liquid column for resetting said counter means to a zero condition.

9. Automatic control structure for an apparatus for analyzing the physical properties of particles suspended in a vehicle liquid having electrical properties distinct from like properties of said particles, said apparatus including, a first vessel and a second vessel insulated one from the other, said first vessel for containing a body of said suspension and said second vessel for containing a body of electrolyte, means forming an aperture between said vessels, means for supplying an electrical current to pass through said aperture, means for causing said suspension to flow through said aperture, and counter means responsive to the passage of particles through said aperture for providing a count indication of the particles passing through said aperture; said automatic control structure comprising: a start electrode for deriving a first electrical signal responsive to the flow of suspension through said aperture, a stop electrode spaced apart from the start electrode for deriving a second electrical signal responsive to the flow of a predetermined amount of suspension through said aperture, means responsive to the initiation of said first electrical signal for enabling said current supplying means, and means responsive to said second electrical signal for disabling said count indicating means, whereby a count indication of particles in said predetermined suspension volume is established in said counter means.

10. Automatic control structure for an apparatus for analyzing the physical properties of particles suspended in a conductive vehicle liquid having electrical properties distinct from like properties of said particles, said apparatus including, a first vessel and a second vessel insulated from one another and having means defining an aperture communicating therebetween, a manometer siphon comprising a high density, conductive liquid coupled to the second vessel for causing flow of said vehicle liquid from the first to said second vessel by way of said aperture, first and second electrodes spaced apart in said siphon for defining a metering zone therein, an electric current source connected for passing current between said vessels by way of said aperture, and a detector for deriving electrical signals indicative of the passage of particles by way of said aperture; said automatic control structure comprising: circuit means in circuit with said first electrode and automatically responsive to contacting of said first electrode by said conductive manometer siphon liquid for controlling passing of said electric current between said vessels.

11. Apparatus as set forth in claim 10 and, in combination therewith, means responsive to said derived signals for displaying the passage of particles through said aperture; said automatic control structure further comprising: display inhibiting means interposed between said circuit means and said displaying means for selectively inhibiting said displaying means and controlled by said circuit means.

12. Apparatus as set forth in claim 10 and in combination therewith means responsive to said derived signals for designating the passage of particles through said aperture; said automatic control structure further comprising: means automatically responsive to actuation of said circuit means for resetting said designating means to a zero condition.

13. The automatic control structure as set forth in claim 10, which further comprises: means responsive to the contacting of said second electrode by said manometer conductive liquid for terminating flow of electric current from said source.

14. The automatic control structure as set forth in claim 10 which further comprises means connected in circuit with said electrodes for controlling operation of said current source.

15. The automatic control structure as set forth in claim 12 wherein said circuit means comprises gate means for controlling application of said derived electrical signals to said designating means.

16. The automatic control structure as set forth in claim 11 wherein said circuit means comprises a flip-flop circuit having first and second alternatively conductive elements, said flip-flop circuit being connected for receiving signals from said electrodes, said first element being connected in a conductive first state for shunting said electrode signals to ground and in a non-conducting second state responsive to the contacting of said first electrode by said conductive manometer liquid for enabling said displaying means and for shifting said second element to a conductive condition for coupling said electric current source to said aperture.

17. An apparatus for counting particles suspended in a fluid comprising: means holding two bodies of fluid one of which is a suspension of particles, means providing an aperture between the bodies, a source of electrical current being coupled with the bodies to cause electrical current to flow through the aperture, detecting means for deriving signals representing particles passing through the aperture, counter means adapted to be driven by said signals to register the number of passed particles, manometer means including a movable manometric fluid connected to the second body for drawing fluid therefrom by movement of the manometric fluid and thereby drawing suspension through the aperture, a conduit for defining the course of flow of the manometric fluid and having a start electrode and a stop electrode defining a metering zone therein, the normal position of the fluid being quiescent and electrically contacting the electrodes, the manometer means and means holding the second body having a manometric fluid drawing device operable to draw the manometric fluid inwardly of the manometer toward its connection with the second body to unbalance the fluid and withdraw the same out of the metering zone and out of contact with the electrodes and the drawing device adapted to be rendered inoperative when the manometric fluid is unbalanced whereby afterward to permit the manometric fluid to run back into the metering zone and draw suspension through the aperture in the course of running back toward said quiescent condition, automatic means for selectively connecting the source of current to the bodies, for disabling the counter means at all times except while the manometric fluid is moving into the metering zone and for resetting the counter means to zero after once having registered a count thereon, said disabling means comprising an AND gate having three input channels and an output channel, the output channel being connected to the counter means and driving the counter means when there are inputs on all input channels, one input channel comprising a circuit applying the signals from the detecting means to the AND gate, another input channel comprising a circuit connected with said start electrode and operative to produce a second signal input whenever the manometric fluid is in engagement with said start electrode, and the third input channel comprising a memory circuit connected to the AND gate and operative to provide a third input signal when the manometric fluid has passed and isolated the start electrode in an unbalancing movement and to maintain said third signal even after the manometric fluid has been permitted to return toward balanced condition, has engaged the start electrode, and until the manometric fluid has traversed the metering zone and contacted the stop electrode at which time said third signal is removed.

18. Apparatus as set forth in claim 17 in which the third channel to the AND gate comprises a semi-conductor element connected also to said one input channel, the memory circuit provides a current flow to forward bias said semi-conductor element to short circuit said one input channel all the time that said manometric fluid is withdrawing from said metering zone in unbalancing movement, but provides a back-biasing potential after the manometric fluid is fully withdrawn and passes the start electrode and retains said back-biasing potential upon the return of the fluid toward quiescent condition and until the manometric fluid has fully filled the metering zone, said back biasing potential serving to block said semi-conductor element to permit signals from the detecting means to be applied to said AND gate.

19. An apparatus for counting particles suspended in a fluid comprising: means holding two bodies of fluid one of which is a suspension of particles, means providing an aperture between the bodies, a source of electrical current being coupled with the bodies to cause electrical current to flow through the aperture, detecting means for deriving signals representing particles passing through the aperture, counter means adapted to be driven by said signals to register the number of passed particles, manometer means including a movable manometric fluid connected to the second body for drawing fluid therefrom by movement of the manometric fluid and thereby drawing suspension through the aperture, a conduit for defining the course of flow of the manometric fluid and having a start electrode and a stop electrode defining a metering zone therein, the normal position of the fluid being quiescent and electrically contacting the electrodes, the manometer means and means holding the second body having a manometric fluid drawing device operable to draw the manometric fluid inwardly of the manometer toward its connection with the second body to unbalance the fluid and withdraw the same out of the metering zone and out of contact with the electrodes and the drawing device adapted to be rendered inoperative when the manometric fluid is through the aperture in the course of running back toward said quiescent condition, means for selectively connecting the source of current to the bodies, automatic means for disabling the counter means at all times except while the manometric fluid is moving into the metering zone and automatic means for resetting the counter means to zero after once having registered a count thereon, both said automatic means comprising a memory device having two states, one of which is established by electrical engagement of the manometric fluid with both electrodes in moving to quiescent condition and maintained thereafter until the manometric fluid has been moved in the opposite direction sufficiently to withdraw same from the metering zone, the second of which is established upon said last mentioned withdrawal and isolation of the start electrode and maintained until the manometric fluid has returned and once more filled the metering section and contacted the stop electrode, and means operated by the memory device when in its second state to connect the current source to the bodies and to disconnect same when in said first state.

20. The apparatus set forth in claim 19 and further comprising an AND gate comprising the disabling means, the output of the AND gate being connected to the counter means, the detecting means being connected to the input of the AND gate, and means operated by the memory device only when in said first state disabling the input to the AND gate.

21. The apparatus as set forth in claim 20 in which the reset means is operated by said memory device momentarily when said start electrode is contacted to produce a signal to change said memory device from its first to its second state.

22. The apparatus set forth in claim 19 and further comprising a source of illumination for illuminating the aperture, and means for dimming said source, said memory device being connected to disable the dimming means when in said second state.

23. The apparatus set forth in claim 21 and further comprising delay means between the memory circuit and the start electrode so that the change of state signal is delayed, delaying the resetting of said counter.

24. The apparatus set forth in claim 17 and further comprising means to delay the signal from the start electrode to the AND gate.

References Cited
UNITED STATES PATENTS 3,271,671   9/1966   Coulter _____________ 324—71

RUDOLPH V. ROLINEC, *Primary Examiner.*

E. E. KUBASIEWICZ, *Assistant Examiner.*